US008505647B2

(12) United States Patent
Kasuya et al.

(10) Patent No.: US 8,505,647 B2
(45) Date of Patent: Aug. 13, 2013

(54) HAND-HELD TOOL

(75) Inventors: Yoshihiro Kasuya, Anjo (JP); Masanori Furusawa, Anjo (JP); Hajime Takeuchi, Anjo (JP); Masahiro Watanabe, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 12/945,190

(22) Filed: Nov. 12, 2010

(65) Prior Publication Data

US 2011/0114347 A1 May 19, 2011

(30) Foreign Application Priority Data

Nov. 19, 2009 (JP) ................................ 2009-263869

(51) Int. Cl.
*B23Q 41/00* (2006.01)

(52) U.S. Cl.
USPC .................................. 173/11; 173/2; 173/20

(58) Field of Classification Search
USPC ................................................ 173/2, 11, 20
See application file for complete search history.

(56) References Cited

U.S. PATENT DOCUMENTS 4,051,351 A * 9/1977 Mallick et al. .................. 700/90
4,410,846 A * 10/1983 Gerber et al. ................. 318/490
4,614,134 A * 9/1986 Bohle ........................... 475/125
6,111,515 A * 8/2000 Schaer et al. ................. 340/680
6,834,730 B2 * 12/2004 Gass et al. ......................... 173/2
7,036,703 B2 * 5/2006 Grazioli et al. ................. 227/10
2003/0006051 A1 * 1/2003 Schmitzer et al. .............. 173/49
2003/0037423 A1 * 2/2003 Siegel ........................ 29/407.01
2004/0045727 A1 * 3/2004 Allums et al. .................... 173/1
2006/0037766 A1 * 2/2006 Gass et al. ....................... 173/20
2007/0034394 A1 * 2/2007 Gass et al. ......................... 173/2

FOREIGN PATENT DOCUMENTS

JP B2-60-31635 7/1985

* cited by examiner

*Primary Examiner* — M. Alexandra Elve
*Assistant Examiner* — Eyamindae Jallow
(74) *Attorney, Agent, or Firm* — Oliff & Berridge, PLC

(57) ABSTRACT

An effective technique for detecting several load conditions different in presence or absence and magnitude of load applied to a tool bit is provided in a hand-held tool. A hand-held tool 101 performs a predetermined operation while pressing a tool bit 119 mounted in a front end region of a tool body 103 against a workpiece. A plurality of detecting sensors 161 of different kinds detect several load conditions different in presence or absence and magnitude of load applied to the tool bit 119. The hand-held tool 101 includes at least one of an indicating device 171 which indicates the load conditions based on a result detected by the detecting sensors 161, and a driving control device 135 which controls driving of the tool bit 119 based on the detected result.

12 Claims, 3 Drawing Sheets

HAND-HELD TOOL

BACKGROUND OF THE INVENTION

1. Field of the Invention

The invention relates to a hand-held tool which performs a predetermined operation on a workpiece by driving a tool bit.

2. Description of the Related Art

A known electric hammer provides a user with information for improvement of working efficiency. Japanese Patent Publication No. 60-31635 discloses a technique in which a pressing force detector is provided for detecting a pressing load applied when the user performs a hammering operation while pressing a tool bit in the form of a hammer bit against the workpiece, and it is calculated and indicated whether the pressing force detected by the detector is at the optimum.

In the above-described known art, the load applied to the hammer bit is detected by using the pressing force detector. As for detecting the pressing load of the hammer bit, a known sensor can accurately detect whether the hammer bit is under no-load conditions in which it is not pressed against the workpiece or under loaded conditions in which it is pressed against the workpiece and/or the presence or absence of the pressing load under which the load current largely changes. However, such a sensor is not suitable for detection of the magnitude of load under which the change of the load current of the motor is small due to insufficient pressing or excessive pressing.

SUMMARY OF THE INVENTION

Accordingly, it is an object of the invention to provide a technique to detect several load conditions different in presence or absence and magnitude of load applied to a tool bit in a hand-held tool.

Above-described object can be achieved by the claimed invention. According to a preferred aspect of the invention, a hand-held tool is provided which performs a predetermined operation mounted in a front end region of a tool body against a workpiece. The "hand-held tool" according to the invention preferably represents an impact tool such as an electric hammer or hammer drill. It also suitably includes a drill and a vibration drill for drilling operation, an electric disc grinder for grinding and polishing operation, a rotary cutting machine such as a circular saw for cutting a workpiece, and a screw tightening machine for screw tightening operation.

According to the invention, a plurality of detecting sensors of different kinds detect several load conditions different in presence or absence and magnitude of load applied to the tool bit. Further, at least one of an indicating device and a driving control device are provided. The indicating device indicates the load conditions based on a result detected by the detecting sensors and the driving control device controls driving of the tool bit based on the detected result. The "several load conditions different" according to the invention preferably represents no-load conditions under which the tool bit is not pressed against the workpiece, normal load conditions under which the tool bit is pressed against the workpiece, and heavy load conditions under which the tool bit is pressed against the workpiece under excessive load. Further, the "plurality of detecting sensors of different kinds" in this invention typically includes a means for detecting load current of the motor, and a position sensor for detecting relative positional displacement of two members which move relative to each other when the tool bit is pressed against the workpiece. Further, the manner of indication of the "indicating device" according to the invention may preferably includes visual indication, for example, by light, and audio indication by a voice or a sound such as a buzzer. Further, the "driving control of the tool bit" according to the invention preferably represents change of the rotational speed of the tool bit.

According to the invention, with the construction in which a plurality of detecting sensors of different kinds detect several load conditions different in presence or absence and magnitude of load applied to the tool bit, different load conditions of the tool bit can be accurately and rationally detected by utilizing the properties of the different detecting sensors. Further, based on the result detected by the detecting sensors, information relating to the load conditions can be indicated to the user and/or driving of the tool bit can be controlled. Further, in a construction in which information relating to the load conditions is indicated to the user, avoidance of use under heavy load conditions can be furthered. Therefore, the internal mechanism can be protected from application of excessive load, so that the durability of the hand-held tool can be enhanced.

According to a further aspect of the invention, the hand-held tool may have a handle which is mounted to the tool body for relative movement and designed to be held by a user. Further, the detecting sensors of different kinds comprise a current sensor for detecting load current of the motor, and a position sensor for detecting the position of the handle with respect to the tool body. If the hand-held tool is a hammer or a hammer drill, the "handle which is mounted to the tool body for relative movement" in this invention is designed as a vibration-proof handle which is connected to the tool body via an elastic element. At this time, the direction of the "relative movement" is a direction in which the tool bit is pressed against the workpiece, or the axial direction of the tool bit.

According to this aspect, the load conditions under which the load current largely changes when the load conditions change between different load conditions of the tool bit are detected by the current sensor, and the load conditions under which the load current changes a little when the load conditions change between different load conditions are detected by detecting the position of the handle with respect to the tool body by the position sensor. In this manner, each of the load conditions can be accurately detected.

According to a further aspect of the invention, the position sensor may comprise a micro-switch. By using the microswitch as the position sensor, the amount of slight displacement of the handle with respect to the tool body can be detected with high accuracy.

According to a further aspect of the invention, the indicating device is designed to provide indications in different manners according to the detected load conditions. The manner of "providing indications in different manners" may preferably includes the manner of changing the color of a single light according to the detected load conditions, the manner of changing the lightening method, for example, between continuous lighting and blinking, or the manner of turning on and off several lights according to the detected load conditions.

According to this aspect, effective information for performing an operation can be provided to the user by give indications according to the detected load conditions.

According to a further aspect of the invention, at least one of the detecting sensors is designed to make the indicating device indicate the load conditions and to make the driving control device control driving of the tool bit. With such a construction, the driving control device controls driving of the tool bit, while the user can get information relating to the load conditions of the tool bit via the indicating device. Therefore, the user can comfortably perform an operation.

According to a further aspect of the invention, the tool bit may comprise a hammer bit that performs at least a striking movement in an axial direction of the tool bit. One of the detecting sensors detects load current of the motor and thereby detects no-load conditions under which the hammer bit is not pressed against the workpiece and normal load conditions under which the hammer bit is pressed against the workpiece, and based on the detected result, the indicating device indicates the load conditions and the driving control device controls driving of the hammer bit. The other detecting sensors detects heavy load conditions under which the hammer bit is pressed against the workpiece by a load exceeding a predetermined load, and based on the detected result, the indicating device indicates the heavy load conditions.

According to this aspect, an impact tool such as a hammer and a hammer drill is provided which performs an operation on a workpiece by striking movement of the tool bit in the axial direction. With such a construction, the driving control device controls driving of the tool bit, while the user can get information relating to the load conditions of the tool bit via the indicating device. Therefore, the user can perform an operation without worry about the operation.

According to a further aspect of the invention, when the position sensor detects a position in which the handle and the tool body are located closest to each other, the indicating device indicates, based on the detected result, that the tool bit is under heavy load conditions. When the handle comprises a vibration-proof handle, the position in which the vibration-proof handle is located when pressed so hard that it loses its vibration proofing effect corresponds to the "position in which the handle and the tool body are located closest to each other". Thus the excessively pressed state can be indicated to the user.

According to the above-described invention, an effective technique for detecting several load conditions different in presence or absence and magnitude of load applied to a tool bit is provided in a hand-held tool. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved hand-held tools and method for using such hand-held tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
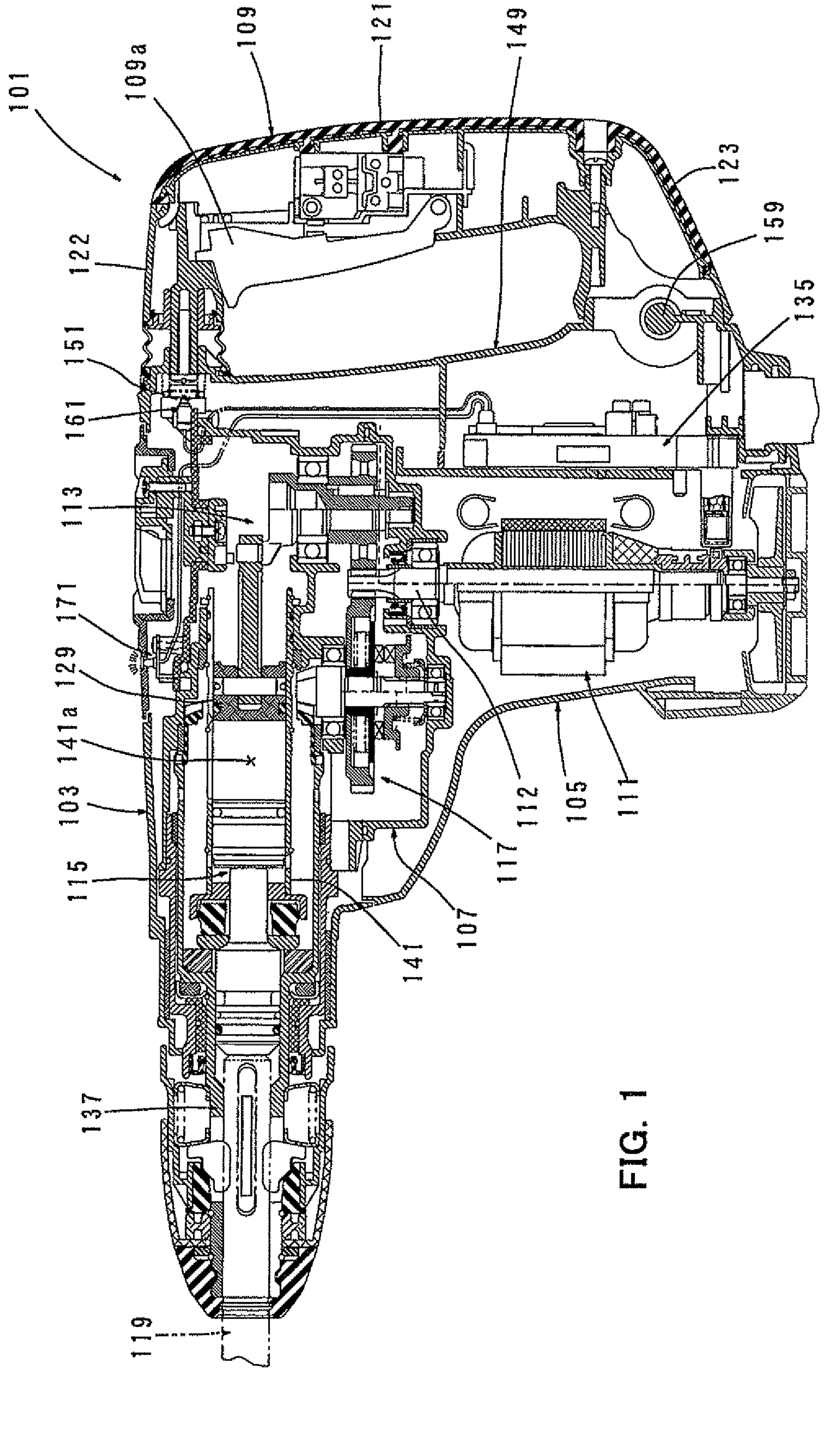
FIG. 1 is a sectional side view showing an entire hammer drill according to an embodiment of the invention.

A representative embodiment of the invention is now described with reference to FIGS. 1 to 3. In this embodiment, an electric hammer drill is described as a representative embodiment of the hand-held tool according to the invention. As shown in FIG. 1, a hammer drill 101 mainly includes a body 103 that forms an outer shell of the hammer drill 101, a hammer bit 119 detachably coupled to a front end region (on the left side as viewed in FIG. 1) of the body 103 via a tool holder 137, and a main handle in the form of a handgrip 109 that is designed to be held by a user and connected to the body 103 on the side opposite to the hammer bit 119. The body 103, the handgrip 109 and the hammer bit 119 are features that correspond to the "tool body", the "handle" and the "tool bit", respectively, according to the invention. The hammer bit 119 is held by the tool holder 137 such that it is allowed to reciprocate with respect to the tool holder 137 in its axial direction and prevented from rotating with respect to the tool holder 137 in its circumferential direction. For the sake of convenience of explanation, in a horizontal position of the body 103 in which the axial direction of the hammer bit 119 coincides with a horizontal direction, the side of the hammer bit 119 is taken as the front and the side of the handgrip 109 as the rear.

The body 103 mainly includes a motor housing 105 that houses a driving motor 111, and a gear housing 107 that houses a motion converting mechanism 131, a striking mechanism 115 and a power transmitting mechanism 117. The motion converting mechanism 131, the striking mechanism 115 and the power transmitting mechanism 117 form a driving mechanism for the hammer bit 119. The motion converting mechanism 113 appropriately converts a rotating output of the driving motor 111 into linear motion and then transmits it to the striking mechanism 115. As a result, an impact force is generated in the axial direction of the hammer bit 119 (the horizontal direction as viewed in FIG. 1) via the striking mechanism 115. Further, the power transmitting mechanism 117 appropriately reduces the speed of the rotating output of the driving motor 111 and transmits it to the hammer bit 119, so that the hammer bit 119 is caused to rotate in the circumferential direction.

The driving motor 111 is arranged below the hammer bit 119 in the axial direction of the hammer bit 119 such that an extension of an axis of rotation of the motor (an axis of an output shaft 112) crosses an axis (the axial direction) of the hammer bit 119. The driving motor 111 is driven when a user depresses an operating member in the form of a trigger **109*a* on the handgrip 109**.

The motion converting mechanism 131 mainly includes a crank mechanism. The crank mechanism is designed such that, when the crank mechanism is rotationally driven by the driving motor 111, a driving element in the form of a piston 129 forming a final movable member of the crank mechanism linearly moves within a cylinder 141 in the axial direction of the hammer bit. The power transmitting mechanism 117 mainly includes a gear speed reducing mechanism formed by a plurality of gears and serves to transmit the rotating force of the driving motor 111 to the tool holder 137. Thus the tool holder 137 is caused to rotate in the vertical plane, and the hammer bit 119 held by the tool holder 137 rotates. The specific constructions of the motion converting mechanism 113 and the power transmitting mechanism 117 are known, and therefore their detailed description is omitted.

The striking mechanism 115 mainly includes a striking element in the form of a striker 143 that is slidably disposed within the bore of the cylinder 141 together with the piston 129, and an intermediate element in the form of an impact bolt 145 that is slidably disposed within the tool holder 137. The striker 143 is driven via the action of an air spring (pressure fluctuations) of an air chamber 141*a* of the cylinder 141 which is caused by sliding movement of the piston 129. The striker 143 then collides with (strikes) an impact bolt 145 and transmits the striking force to the hammer bit 119 via the impact bolt 145.

The handgrip 109 mainly includes a grip part 121 that extends in a vertical direction transverse to the axial direction of the hammer bit 119. The handgrip 109 also has connecting parts 122, 123 protruding forward from upper and lower ends of the grip part 121, and the upper and lower connecting parts 122, 123 are connected to the rear end of the body 103. Thus, the handgrip 109 forms a loop-shaped handle (D-shaped handle).

The upper connecting part 122 is connected to an upper rear end of the gear housing 107 via an elastic element in the form of a coil spring 151 for absorbing vibration of the handgrip 109 during operation. The coil spring 151 is disposed slightly above the extension of the axis of the hammer bit 119 (on the side of the extension opposite from a pivot 159 described below) and arranged such that the direction of action of its spring force (the longitudinal direction of the spring) generally coincides with the direction of input of vibration or the axial direction of the hammer bit 119. As shown in FIG. 3, the coil spring 151 extends forward through an opening 149*a* formed in an upper rear end of a rear housing cover 149. An extending end (front end) of the coil spring 151 is supported by a spring receiving part 152 integrally formed with the gear housing 107, and the other end (rear end) is supported by a spring receiver 153 mounted to the upper connecting part 122.

A dust-proofing rubber expansion cover 154 is arranged between the front end of the upper connecting part 122 and the rear surface of the rear housing cover 149 and covers the coil spring 151. Further, as shown in FIG. 3, a pair of right and left columnar connection parts 155 are integrally formed on the front surface of the upper connecting part 122 in a symmetrical fashion with respect to the coil spring 151 and protrude forward with a predetermined length. The right and left columnar connection parts 155 are loosely inserted from the rear into bores of right and left cylindrical guides 156 formed on the rear housing cover 149 and can move in the axial direction of the hammer bit 119 (the fore-and-aft direction) with respect to the cylindrical guides 156. Connecting screws 157 are then screwed into the connection parts 155 from the front and a head 157 of each of the connecting screws 157 is held in contact with the front of the associated cylindrical guide 156. Thus the connection parts 155 are prevented from coming out of the associated cylindrical guides 156. In this manner, the upper connecting part 122 is connected such that it is allowed to move in the fore-and-aft direction with respect to the rear housing cover 149.

As shown in FIG. 1, the lower connecting part 123 is rotatably supported by the pivot 159 which is disposed on a lower rear end of the rear housing cover 149 and extends horizontally in the lateral direction. Thus, the handgrip 109 is connected such that it can rotate on the pivot 159 in the axial direction of the hammer bit 119 (the fore-and-aft direction) with respect to the body 103. Thus, the handgrip 109 is formed as a vibration-proof handle, and during operation, the vibration absorbing effect of the coil spring 151 can be effectively exerted against vibration transmitted from the body 103 to the handgrip 109.

The rear housing cover 149 is arranged to cover a rear region including a region rearward of the side of the gear housing 107 and a rear region including a region rearward of the side of the motor housing 105. The rear housing cover 149 is fastened to the motor housing 105 and the gear housing 107 by fastening means (not shown) such as screws. Specifically, the rear housing cover 149 is provided as a component forming part of the body 103.

In the hammer drill 101 constructed as described, when the driving motor 111 is driven by depressing the trigger 109*a*, the rotating output of the motor is converted into linear motion via the motion converting mechanism 113 and then causes the hammer bit 119 to perform linear movement in the axial direction or hammering movement via the striking mechanism 115. Further, in addition to the hammering movement, the hammer bit 119 is caused to perform drilling movement in the circumferential direction by the power transmitting mechanism 117 which is driven by the rotating output of the driving motor 111. Specifically, the hammer drill 101 can perform a drilling operation on a workpiece (such as concrete) by causing the hammer bit 119 to perform hammering movement in the axial direction and drilling movement in the circumferential direction, while the user holds the handgrip 109 and applies a forward pressing force against the biasing force of the coil spring 151 in such a manner as to press the hammer bit 119 against the workpiece motor.

In this embodiment, a current sensor (not shown) for detecting a load applied to the hammer bit 119 and a microswitch 161, an indicator 171 for visually indicating the load conditions of the hammer bit 119 to the user, and a controller 135 for controlling driving of the hammer bit 119 or driving of the driving motor 119 according to the load conditions, are provided. The current sensor and the microswitch 161 are features that correspond to the "several different detecting sensors" in this invention. The indicator 171 and the controller 135 are features that correspond to the "indicating device" and the "driving control device", respectively, in this invention.

The current sensor is provided as a means for detecting presence or absence of the force of pressing the hammer bit 119 against the workpiece, or presence or absence of the load applied to the hammer bit 119 (rotational resistance and/or striking resistance from the workpiece). When the driving motor 111 is driven by depressing the trigger 109*a*, the current sensor measures the load current of the driving motor 111 which changes according to whether the hammer bit 119 is pressed against the workpiece, and outputs the measurement to the controller 135. Specifically, the current sensor detects whether the hammer bit 119 is in the state in which it is not pressed against the workpiece (hereinafter referred to as being under no-load conditions or under no load) or in the state in which it is pressed against the workpiece by a normal pressing force (hereinafter referred to as being under normal load conditions or under normal toad).

The microswitch 161 is provided as a means for detecting the state of the hammer bit 119 in which it is pressed against the workpiece by an excessive pressing force or in which the user applies an excessive forward pressing force to the handgrip 109 (hereinafter referred to as being under heavy load conditions or under heavy load), by the position of the handgrip 109 with respect to the body 103. As shown in FIGS. 2 and 3, the microswitch 161 is mounted to the gear housing 107 and normally held in the off (or on) position. When the handgrip 109 is pressed forward by an excessive force and an actuation part 163 is pressed by the head 157*a* of the connecting screw 157 mounted to the handgrip 109, the microswitch 161 is turned on (or off). The on/off signal of the microswitch

161 is outputted to the controller 135. Specifically, the microswitch 161 is designed to detect the connecting screw 157 of the handgrip 109 as a detected part, and the microswitch 161 is a feature that corresponds to the "position sensor" according to this invention.

When the actuation part 163 is pressed by the head 157*a* of the connecting screw 157, the handgrip 109 is located with respect to the body 103 in a position in which the vibration-proofing coil spring 151 is contracted to a maximum with adjacent coil parts held in close contact with each other so that the handgrip 109 no longer functions as a vibration-proof handle. The position in which the handgrip 109 is located with respect to the body 103 when the actuation part 163 of the microswitch 161 is pressed corresponds to the "position in which the handle is located as close as possible to the tool body" according to this invention.

Figure 2:
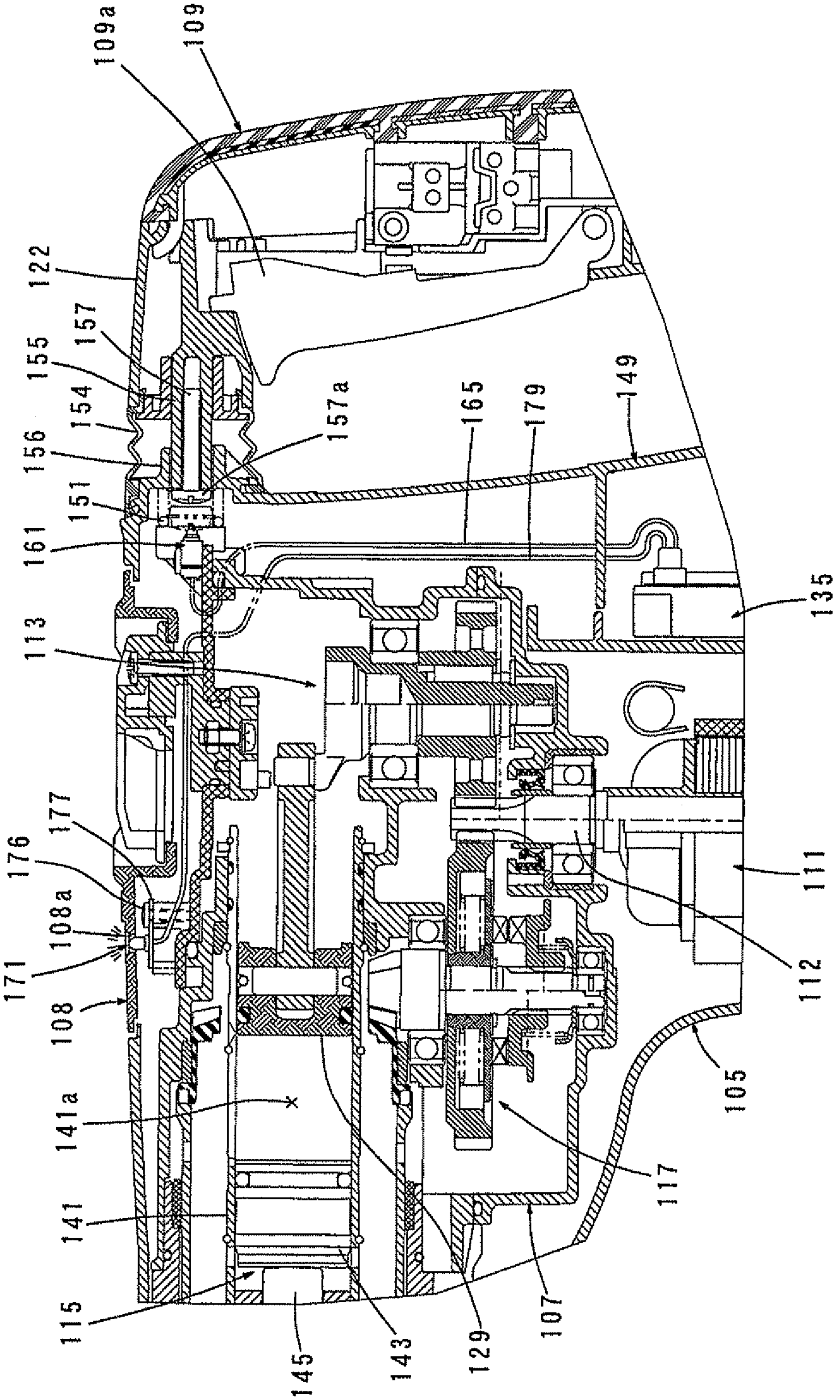
FIG. 2 is an enlarged sectional view of part of FIG. 1.
Figure 3:
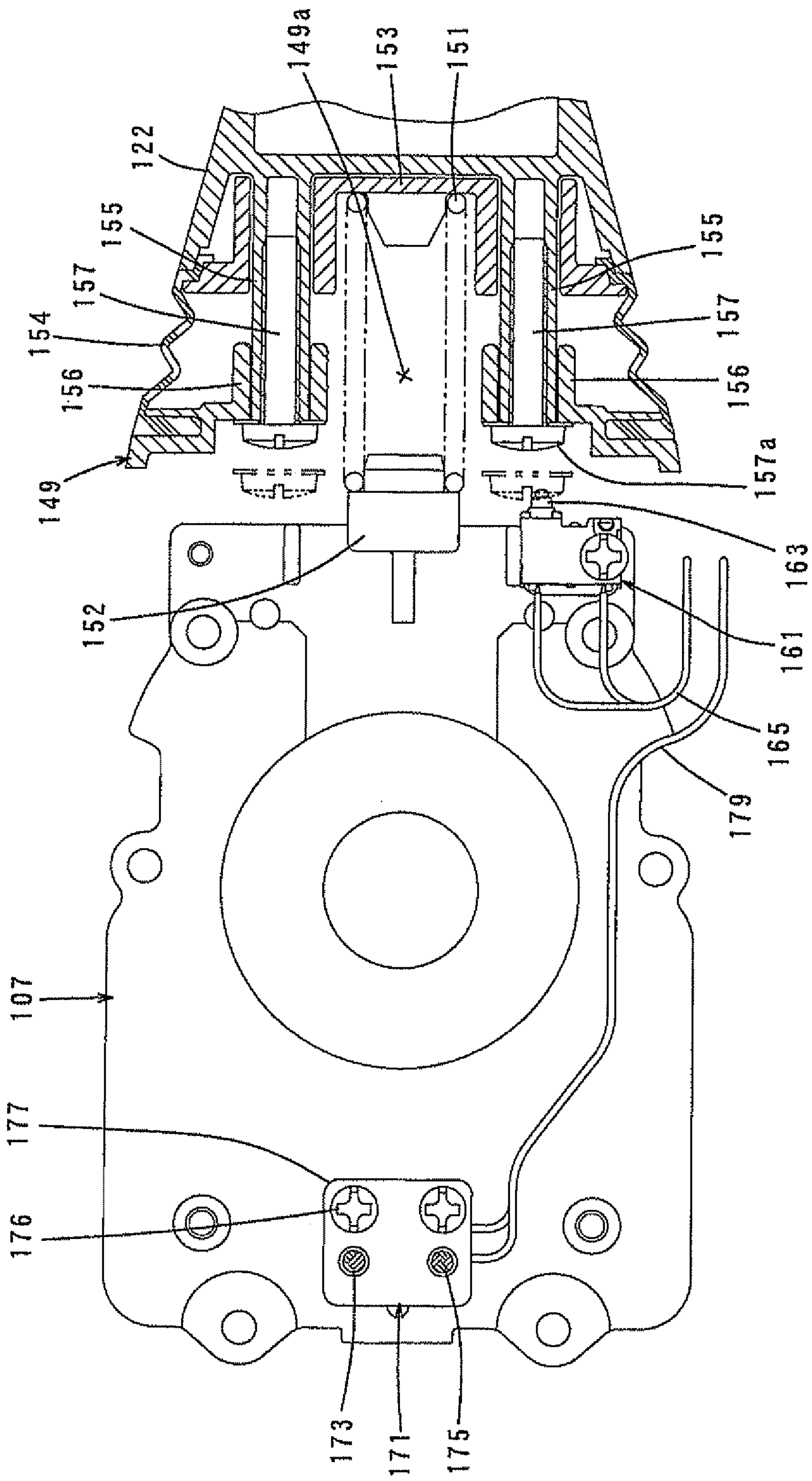
FIG. 3 is a sectional plan view showing an indicator, a microswitch and part of a handgrip.

As shown in FIGS. 2 and 3, the indicator 171 mainly includes blue and red LED lights (light-emitting diodes) 173, 175 and a light base 177 for holding the LED lights 173, 175. The indicator 171 is mounted on the upper surface of the gear housing 107 by fastening the base 177 to the gear housing 107 by screws 176. The two LED lights 173, 175 emit light to the outside of the upper surface region of the body 103 through an opening 108*a* formed in a gear housing cover 108 which covers the gear housing 107.

The controller 135 is disposed at the rear of the motor housing 105 and disposed in a space between the motor housing 105 and the rear housing cover 149. The controller 135 controls turning on and off of the LED lights 173, 175 of the indicator 171, based on the measured value of the load current of the driving motor 111 which is measured by the current sensor and the result detected by the microswitch 161. In this embodiment, under no-load conditions in which the measured value is lower than a predetermined value, both of the LED lights 173, 175 are turned off, while, under normal load conditions in which the measured value is higher than the predetermined value, only the blue LED light 173 is turned on. Further, under heavy load conditions in which the microswitch 161 is turned on, only the red LED light 175 is turned on.

Further, the controller 135 controls the speed of the driving motor 111 such that the driving motor 111 (the hammer bit 119) is driven at low speed under no load, at steady high speed under normal load, and at high torque and lower speed under heavy load than the speed under normal load. In the drawings, a wire for electrically connecting the microswitch 161 and the controller 135 is designated by 165, and a wire for electrically connecting the LED lights 173, 175 and the controller 135 is designated by 179.

The hammer drill 101 of this embodiment is constructed as described above. Therefore, when the user holds the handgrip 109 and depresses the trigger 109*a* to drive the driving motor 111 in order to perform an operation, the load current of the driving motor 111 is measured by the current sensor, and the measured value is outputted to the controller 135. When the measured value inputted from the current sensor is lower than the set value, the controller 135 determines that the hammer bit 119 is under no load conditions in which it is not pressed against the workpiece, and controls such that both of the LED lights 173, 175 of the indicator 171 are off and the driving motor 111 is driven at low speed.

When the measured value inputted from the current sensor is higher than the set value, the controller 135 determines that the hammer bit 119 is under normal load conditions in which it is pressed against the workpiece by a normal pressing force (within the range of compressive deformation of the coil spring 151 of the handgrip 109), and controls such that only the blue LED light 173 is turned on and the driving motor 111 is driven at steady high speed.

Further, when the actuation part 163 of the microswitch 161 is pressed by the head 157*a* of the connecting screw 157, the microswitch 161 detects the connecting screw 157 and the detected signal is outputted to the controller 135. Then the controller 135 determines that the handgrip 109 is excessively pressed until adjacent coil parts of the coil spring 151 get in close contact with each other and the hammer bit 119 is pressed against the workpiece under heavy load conditions. At this time, the controller 135 controls such that only the red LED light 175 of the indicator 171 is turned on and the driving motor 111 is driven at high torque and lower speed than the speed under normal load. Thus, the hammer bit 119 is allowed to perform a hammer drill operation at high torque.

Thus, according to this embodiment, two kinds of detecting sensors, i.e. the current sensor that measures the load current of the driving motor 111 and the microswitch 161 that detects the position of the vibration-proof handgrip 109 connected to the body 103 with respect to the body 103, can be used to detect the no-load conditions, the normal load conditions and the heavy load conditions which are different in presence or absence and magnitude of the load applied to the hammer bit 119. Thus, the load conditions of the hammer bit 119 can be indicated to the user by the indicator 171. Further, the speed of the driving motor 111 can be controlled according to the load conditions and the hammer bit 119 can be rotated at a speed appropriate to the load conditions.

The load current of the driving motor 111 largely changes when the load conditions change between the no-load conditions and the normal load conditions, but it changes a little when the load conditions change between the normal load conditions and the heavy load conditions. In this embodiment, the no-load conditions and the normal load conditions are detected by the current sensor, and the heavy load conditions are detected by the microswitch 161. The microswitch 161 detects the position of the handgrip 109 with respect to the body 103, particularly when the coil spring 151 is contracted until adjacent coil parts get in close contact with each other. Thus, each of the load conditions can be accurately and rationally detected by utilizing the properties of the current sensor and the microswitch 161. Further, under the heavy load conditions, it can be indicated to the user that the handgrip 109 is not functioning as a vibration-proof handle.

Further, according to this embodiment, the amount of slight displacement of the handgrip 109 with respect to the body 103 can be reliably detected by using a position sensor in the form of the microswitch 161.

Further, according to this embodiment, with the construction in which the present load conditions of the hammer bit 119 can be indicated to the user by using the indicator 171, the user can perform an operation, without worry about the operation, based on the information of the indicator. Further, by providing information to the user about the load conditions, avoidance of use under heavy load conditions can be furthered. Therefore, the internal mechanism can be protected from application of excessive load, so that the durability of the hammer drill 101 can be enhanced. Further, with the construction in which the indicator 171 mainly formed by the LED lights 173, 175 is disposed in the upper surface region of the body 103 (the gear housing 107) and emits light through the opening 108*a* of the gear housing cover 108, the user can readily check the information relating to the load conditions by on and off of the LED lights 173, 175 while keeping an eye on the region to be worked on by the hammer bit 119.

Further, in this embodiment, several load conditions are indicated by on and off of the LED lights 173, 175 of the indicator 171 and the color of the illuminated light, but this manner of indication of the LED lights 173, 175 is described only as one example and can be appropriately changed, for example, such that the light blinks under heavy load conditions. As other examples, a single LED light may be used for such indication. Instead of indication by light, digital indication, for example, by a liquid crystal panel, may be used. Or, instead of visual indication, audio indication by a voice or a sound such as a buzzer.

Further, in this embodiment, when the presence or absence of the load applied to the hammer bit 119 and several load conditions different in magnitude of the load are detected, based on the detected result, indication is made by the indicator 171 and the controller 135 controls driving of the driving motor 111, but it may be constructed such that at least one of the indication and the control is performed.

Further, in this embodiment, the microswitch 161 outputs a detection signal when adjacent coil parts of the vibration-proof coil spring 151 get in close contact with each other, but it may be constructed such that it outputs a detection signal before close contact of the adjacent coil parts. Further, the microswitch 161 may be of non-contact type, instead of contact type.

Further, in this embodiment, the electric hammer drill 101 is described as a representative example of the hand-held tool of this invention, but the invention can also be applied to hand-held tools other than the electric hammer drill, including a drill and a vibration drill for drilling operation, an electric disc grinder for grinding and polishing operation, a rotary cutting machine such as a circular saw for cutting a workpiece, and a screw tightening machine for screw tightening operation.

Further, according to all aspects of the invention, following construction can be provided.

Aspect 1 "The hand-held tool as defined in any one of claims 1 to 7, wherein the indicating device comprises a visual indicator having at least one light."

Aspect 2 "The hand-held tool according to aspect 1, wherein the indicator is disposed in a region rearward of the tool bit when the tool is hand-held by a user and in an upper surface region of the tool body."

DESCRIPTION OF NUMERALS

101 hammer drill (hand-held tool)
103 body
105 motor housing
107 gear housing
108 gear housing cover
108*a* opening
109 handgrip (handle)
109*a* trigger
111 driving motor
112 output shaft
113 motion converting mechanism
115 striking mechanism
117 power transmitting mechanism
119 hammer bit (tool bit)
121 grip part
122, 123 connecting part
129 piston
135 controller
137 tool holder
141 cylinder
141*a* air chamber
143 striker
145 impact bolt

149 rear housing cover
149*a* opening
151 coil spring
152 spring receiving part
153 spring receiver
154
155 connection part
156 cylindrical guide
157 connecting screw
157*a* head
159 rotary shaft
161 microswitch
163 actuation part
165 wire
171 indicator
173 LED light
175 LED light
176 screw
177 light base
179 wire

What is claimed is:

1. A hand-held tool which performs a predetermined operation with a tool bit mounted in a front end region of a tool body against a workpiece comprising:
a plurality of detecting sensors of different kinds which detect several load conditions different in presence or absence and magnitude of load applied to the tool bit;
at least one of an indicating device and a driving control device, wherein the indicating device indicates the load conditions based on a result detected by the detecting sensors and the driving control device controls driving of the tool bit based on a result detected by the detecting sensors; and
a handle which is mounted to the tool body for relative movement, the handle being held by a user of the hand-held tool,
wherein one of the detecting sensors of different kinds is defined by a current sensor for detecting load current of the motor and the other by a position sensor for detecting the position of the handle with respect to the tool body.

2. The hand-held tool according to claim 1, wherein the position sensor includes a micro-switch.

3. The hand-held tool according to claim 1, wherein the indicating device provides indications in different manners according to the detected load conditions.

4. The hand-held tool according to claim 1, wherein at least one of the detecting sensors is provided to make the indicating device indicate the load conditions and the driving control device control driving of the tool bit.

5. The hand-held tool according to claim 1, wherein the tool bit includes a hammer bit that performs at least a striking movement in an axial direction of the tool bit, and one of the detecting sensors detects load current of the motor to detect no-load conditions under which the hammer bit is not pressed against the workpiece and normal load conditions under which the hammer bit is pressed against the workpiece,
and wherein based on the detected result, the indicating device indicates the load conditions and the driving control device controls driving of the hammer bit, and the other detecting sensors detects heavy load conditions under which the hammer bit is pressed against the workpiece under a load exceeding a predetermined load, and based on the detected result, the indicating device indicates the heavy load conditions.

6. The hand-held tool according to claim 1, wherein, when the position sensor detects a position in which the handle and the tool body are located closest to each other, the indicating device indicates, based on the detected result, that the tool bit is under heavy load conditions.

7. The hand-held tool according to claim 1, wherein the indicating device includes a visual indicator having at least one light.

8. The hand-held tool according to claim 7, wherein the indicator is disposed in a region rearward of the tool bit when the tool is hand-held by a user and in an upper surface region of the tool body.

9. The hand-held tool according to claim 1, further comprising a controller that controls the indicating device based on the result detected by the detecting sensors.

10. The hand-held tool according to claim 1, wherein the indicating device indicates the load conditions based on a result detected by the current sensor.

11. The hand-held tool according to claim 1, wherein the indicating device indicates the load conditions based on a result detected by the position sensor.

12. A hand-held tool which performs a predetermined operation with a tool bit mounted in a front end region of a tool body against a workpiece comprising:

different kinds of sensing means for detecting several load conditions different in presence or absence and magnitude of load applied to the tool bit;

at least one of an indicating means and a driving control means, the indicating means indicating the load conditions based on a result detected by the sensing means and the driving control means controlling driving of the tool bit based on a result detected by the sensing means; and a handle which is mounted to the tool body for relative movement, the handle being held by a user of the hand-held tool, wherein one of the different kinds of sensing means is defined by a current sensing means for detecting load current of the motor and the other by a position sensing means for detecting the position of the handle with respect to the tool body.

* * * * *